(12) United States Patent
Jurkovic et al.

(10) Patent No.: US 9,899,902 B2
(45) Date of Patent: Feb. 20, 2018

(54) POLE TO POLE VARIATION IN SHAPE OF INJECTION MOLDED MAGNETS OF INTERNAL PERMANENT MAGNET MACHINES

(71) Applicant: GM GLOBAL TECHNOLOGY OPERATIONS LLC, Detroit, MI (US)

(72) Inventors: Sinisa Jurkovic, Sterling Heights, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 235 days.

(21) Appl. No.: 14/714,897

(22) Filed: May 18, 2015

(65) Prior Publication Data
US 2016/0344274 A1    Nov. 24, 2016

(51) Int. Cl.
H02K 1/27      (2006.01)
H02K 29/03     (2006.01)
H02K 1/24      (2006.01)

(52) U.S. Cl.
CPC ........... *H02K 29/03* (2013.01); *H02K 1/2766* (2013.01); *H02K 1/246* (2013.01)

(58) Field of Classification Search
CPC .......... H02K 1/24; H02K 1/246; H02K 1/27; H02K 1/2706; H02K 1/2766; H02K 1/28; H02K 15/03; H02K 21/12; H02K 21/14; H02K 21/16; H02K 29/03
USPC .............. 310/156.38–156.46, 156.53–156.57
See application file for complete search history.

(56) References Cited

U.S. PATENT DOCUMENTS

| | | | | |
|---|---|---|---|---|
| 5,945,760 A * | 8/1999 | Honda | ................... | H02K 1/276 310/156.53 |
| 6,177,745 B1 * | 1/2001 | Narita | .................. | H02K 1/2766 310/156.43 |
| 6,225,724 B1 * | 5/2001 | Toide | ..................... | H02K 1/276 310/156.53 |
| 6,555,940 B2 * | 4/2003 | Naito | ................... | H02K 1/2766 310/156.55 |
| 6,684,483 B2 * | 2/2004 | Rahman | ................ | H02K 15/03 29/419.2 |
| 7,204,012 B2 * | 4/2007 | Kloepzig | ............. | H02K 1/2733 29/596 |
| 7,730,603 B2 * | 6/2010 | Ward | ...................... | H01F 1/083 29/419.2 |
| 2003/0102755 A1 * | 6/2003 | Naito | .................. | H02K 1/2766 310/156.39 |
| 2014/0252903 A1 * | 9/2014 | Rahman | .................. | H02K 1/02 310/156.53 |

* cited by examiner

*Primary Examiner* — Tran Nguyen
(74) *Attorney, Agent, or Firm* — Quinn IP Law

(57) ABSTRACT

An internal permanent magnet machine includes a wound stator, and a rotor core. The rotor core includes a plurality of first pole cavities, and a plurality of second pole cavities. One of a plurality of magnets is disposed within each of the pole cavities, and is injection molded into their respective cavity. The first pole cavities and the second pole cavities are each arranged in a pre-defined configuration, such that each pole cavity of the first pole cavities is identically positioned with one of the pole cavities of the second pole cavities within their respective pre-defined configurations, to define a corresponding pair of pole cavities. The pole cavity of the first pole cavities and the pole cavity of the second pole cavities of at least one of the corresponding pair of pole cavities define a different shape relative to each other.

11 Claims, 3 Drawing Sheets

POLE TO POLE VARIATION IN SHAPE OF INJECTION MOLDED MAGNETS OF INTERNAL PERMANENT MAGNET MACHINES

TECHNICAL FIELD

The disclosure generally relates to an internal permanent magnet machine, and a method of assembling a rotor assembly for an internal permanent magnet machine.

BACKGROUND

Interior Permanent Magnet (IPM) machines include a rotor assembly having a plurality of magnets of alternating polarity disposed around an outer periphery of the rotor assembly. The rotor assembly is rotatable within a stator which includes a plurality of windings. The rotor assembly magnetically interacts with the stator to generate rotation of the rotor assembly about a central axis of rotation.

Torque pulsation in electrical machines, often referred to as torque ripple, is a major contributor of machine noise and iron losses. Torque ripple is an effect seen in many electric motor designs, and refers to a periodic increase or decrease in output torque as an output shaft of the electric machine rotates. Torque ripple is typically measured as the difference in maximum and minimum torque during one complete revolution. The reduction or minimization of torque ripple in an electric machine is therefore an important design consideration during the design of the electric machine.

SUMMARY

An internal permanent magnet machine is provided. The internal permanent magnet machine includes a wound stator, and a rotor core. The rotor core includes a first pole and a second pole. The first pole defines a plurality of first pole cavities. The second pole defines a plurality of second pole cavities. The rotor core magnetically interacts with the wound stator for rotation about a central axis of rotation. The internal permanent magnet machine further includes a plurality of magnets. One of the plurality of magnets is disposed within each of the plurality of first pole cavities and the plurality of second pole cavities. Each of the plurality of magnets is injection molded into their respective cavity of the plurality of first pole cavities and the plurality of second pole cavities, such that each of the magnet is formed by the shape of their respective cavity. The plurality of first pole cavities and the plurality of second pole cavities are each arranged in a pre-defined configuration, such that each pole cavity of the plurality of first pole cavities is identically positioned within the pre-defined configuration of the plurality of first pole cavities with one of the pole cavities of the plurality of second pole cavities within the pre-defined configuration of the plurality of second pole cavities, to define a corresponding pair of pole cavities. The pole cavity of the plurality of first pole cavities and the pole cavity of the plurality of second pole cavities of at least one of the corresponding pair of pole cavities define a different shape relative to each other, such that each magnet of each corresponding pair of magnets include a different shape relative to each other.

A method of assembling a rotor assembly for an internal permanent magnet machine is also provided. The method includes forming a rotor core. The rotor core is formed to include a first pole defining a plurality of first pole cavities, and a second pole defining a plurality of second pole cavities. The plurality of first pole cavities and the plurality of second pole cavities are each arranged in a pre-defined configuration, such that each pole cavity of the plurality of first pole cavities is identically positioned within the pre-defined configuration of the plurality of first pole cavities with one of the pole cavities of the plurality of second pole cavities within the pre-defined configuration of the plurality of second pole cavities, to define a corresponding pair of pole cavities. The pole cavity of the plurality of first pole cavities and the pole cavity of the plurality of second pole cavities of at least one of the corresponding pair of pole cavities define a different shape relative to each other. Once the rotor core is formed to define the pole cavities, a molten magnetic material is introduced into each of the plurality of first pole cavities and the plurality of second pole cavities. The molten magnetic material within each of the plurality of first pole cavities and the plurality of second pole cavities of the rotor core is then cooled to form a plurality of magnets in each pole cavity respectively, that include the shape of their respective cavity and which are bonded to the rotor core.

Accordingly, because the magnets are injection molded into their respective cavities of the rotor core, the pole cavities of the rotor core may be formed to include different shapes, without having to provide a specific, pre-formed, correspondingly shaped magnet to fit within each respective pole cavity. By changing the specific shape of at least one of the corresponding pair of pole cavities relative to each other, and by using the injection molding technique to form the magnets, the rotor assembly of the electric machine may be designed and manufactured to reduce or minimize torque ripple in the electric machine, without greatly increasing the cost or complexity of manufacturing the rotor assembly.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, an Interior Permanent Magnet (IPM) machine is generally shown at 20. The IPM machine 20 may include, but is not limited to an electric motor or other similar device.

Figure 1:
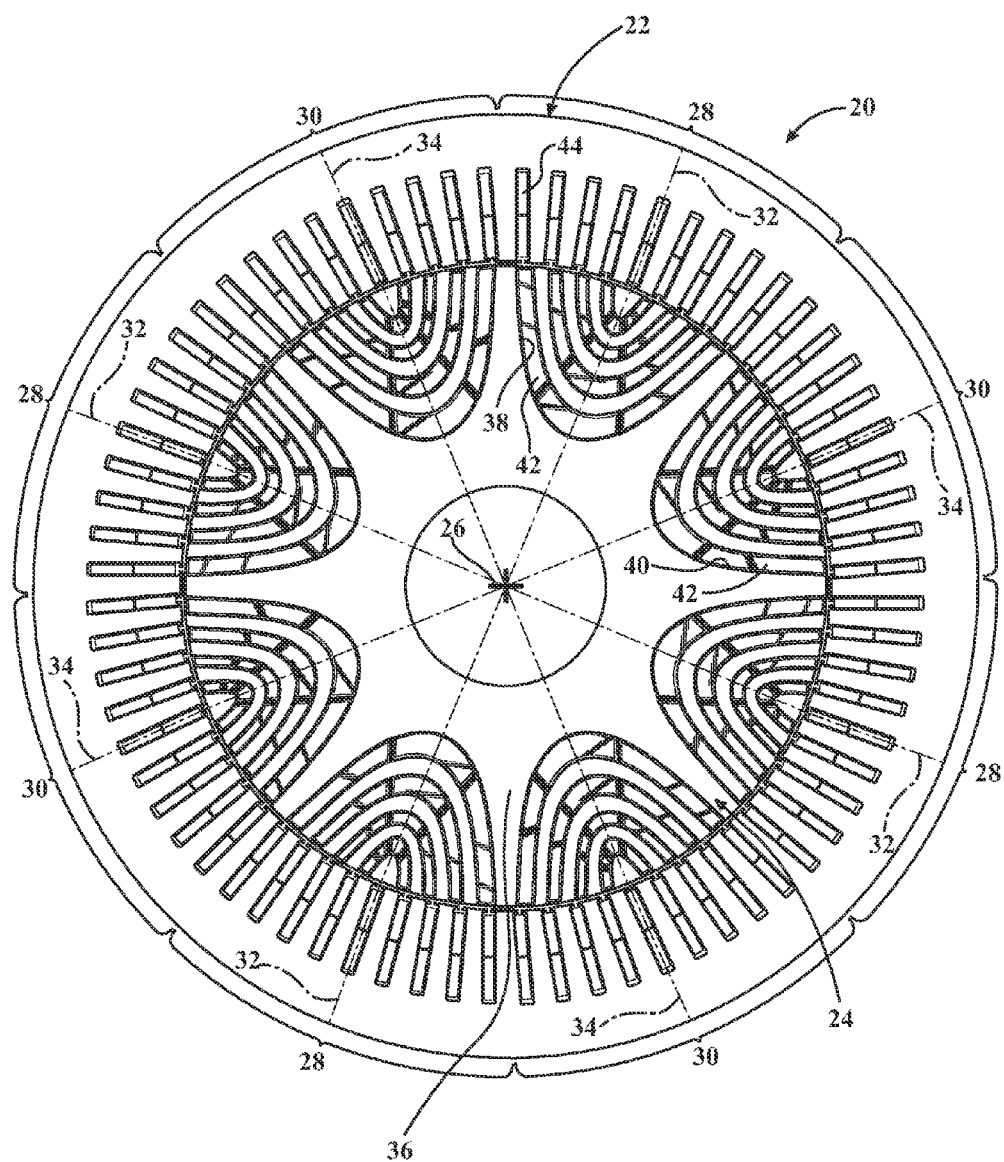
FIG. 1 is a schematic cross sectional view of an internal permanent magnet machine.

Referring to FIG. 1, the IPM machine 20 includes a wound stator 22 and a rotor assembly 24. The rotor assembly 24 is configured for magnetically interacting with the wound stator 22 to rotate relative to the wound stator 22 about a central axis of rotation 26. As shown, the rotor assembly 24 includes a first pole 28 (e.g., a north pole) centered along a first pole axis 32, and a second pole 30 (e.g., a south pole) centered along a second pole axis 34. The first pole axis 32 and the second pole axis 34 extend radially outward from the central axis of rotation 26 through a center of the first pole 28 and the second pole 30 respectively. The central axis of rotation 26 is disposed at a center of a rotor core 36.

Preferably, the rotor assembly 24 includes a plurality of first poles 28 and a plurality of second poles 30. The number of the first poles 28 is equal to the number of the second poles 30. The first poles 28 and the second poles 30 are arranged angularly about the central axis of rotation 26 in an alternating relationship. When the rotor assembly 24 includes a plurality of first poles 28 and a plurality of second poles 30, each first pole 28 is circumferentially disposed between two second poles 30, and each second pole 30 is circumferentially disposed between two first poles 28. FIG. 1 represents an IPM machine 20 having 8 total poles, including 4 first poles 28 and 4 second poles 30. However, it should be appreciated that the total number of poles of the IPM machine 20 may vary from the exemplary embodiment shown in FIG. 1.

The rotor assembly 24 includes the rotor core 36, which defines a plurality of cavities. The cavities are either first pole cavities 38, or second pole cavities 40. The first pole cavities 38 are part of one of the first poles 28, and the second pole cavities 40 are part one of the second poles 30. Each of the first poles 28 includes a pre-determined number of first pole cavities 38 therein, arranged in a pre-defined configuration, and each of the second poles 30 includes a pre-determined number of second pole cavities 40 therein, arranged in the same pre-defined configuration as the first pole cavities 38. The number of first pole cavities 38 in each of the first poles 28 is equal to the number of second pole cavities 40 in each of the second poles 30. Accordingly, the first pole cavities 38 and the second pole cavities 40 are each arranged in the same pre-defined configuration, i.e., an identical orientation. However, as described in greater detail below, the exact size of the cavities of a given position within the pre-defined configuration, may differ between the first pole 28 and the second pole 30. All of the first pole cavities 38 and the second pole cavities 40 extend three-dimensionally into the rotor core 36 as viewed on the page of the figures. The cavities may include cutouts, slots, etc., as is known in the art.

The rotor assembly 24 further includes a plurality of magnets 42. One of the plurality of magnets 42 is disposed within a respective one of the plurality of cavities. Each of the plurality of magnets 42 is injection molded into their respective cavity. Accordingly, each magnet 42 is formed by the shape of their respective cavity. The magnets 42 may include any type of magnetic material suitable for use in the IPM machine 20, and capable of being injection molded into the cavities of the rotor core 36. For example, each of the magnets 42 may be manufactured from and include a ferrite magnetic material, an Alnico magnetic material, or alternatively from a rare earth magnetic material, such as but not limited to Neodymium iron boron (NdFeB).

The injection molding process used to form the magnets 42 is known to those skilled in the art. Once the magnets 42 are formed, they may be referred to as bonded magnets.

Briefly the injection molding process for forming the magnets 42 includes producing a magnetic powder that provides distinct magnetic and physical characteristics. The magnetic powder is typically a mixture of neodymium metal, alloyed with iron and boron, and occasionally alloyed along with other elements in small quantities (such as cobalt). The magnetic powder is combined with synthetic resin or a polymer to form a mixture that is used to form the bonded magnets 42 through the injection molding process. The mixture of the magnetic polymer and the synthetic resin or polymer may be fed into the plurality of cavities 38, 40 and melted at high pressure. Mechanical or hydraulic pressure may be applied to the mixture so as to ensure that the entirety of all of the cavities 38, 40 are filled. An external magnetic field (for anisotropic magnets) may also be applied on the magnet during the injection molding process. The mixture is then allowed to cool in place, thereby forming the bonded magnets 42.

The magnetic material used to form the magnets 42 in each of the first pole cavities 38 and the second pole cavities 40 may be the same, or may be different. Accordingly, it is contemplated that the magnets 42 formed and disposed in the plurality of first pole cavities 38 may be formed from a first material, and the magnets 42 formed and disposed in the plurality of second pole cavities 40 may be formed from a second material that is different than the first material. Alternatively, the magnets 42 formed and disposed in both the first pole cavities 38 and the second pole cavities 40 may include and be formed from the same magnetic material.

The wound stator 22 includes a plurality of windings 44 that magnetically interact with the magnets 42 disposed within the first pole cavities 38 and the second pole cavities 40 of the first poles 28 and the second poles 30 of the rotor core 36 respectively, to generate torque, and cause rotation of the rotor core 36 about the central axis of rotation 26 relative to the wound stator 22, as is known in the art.

Figure 2:
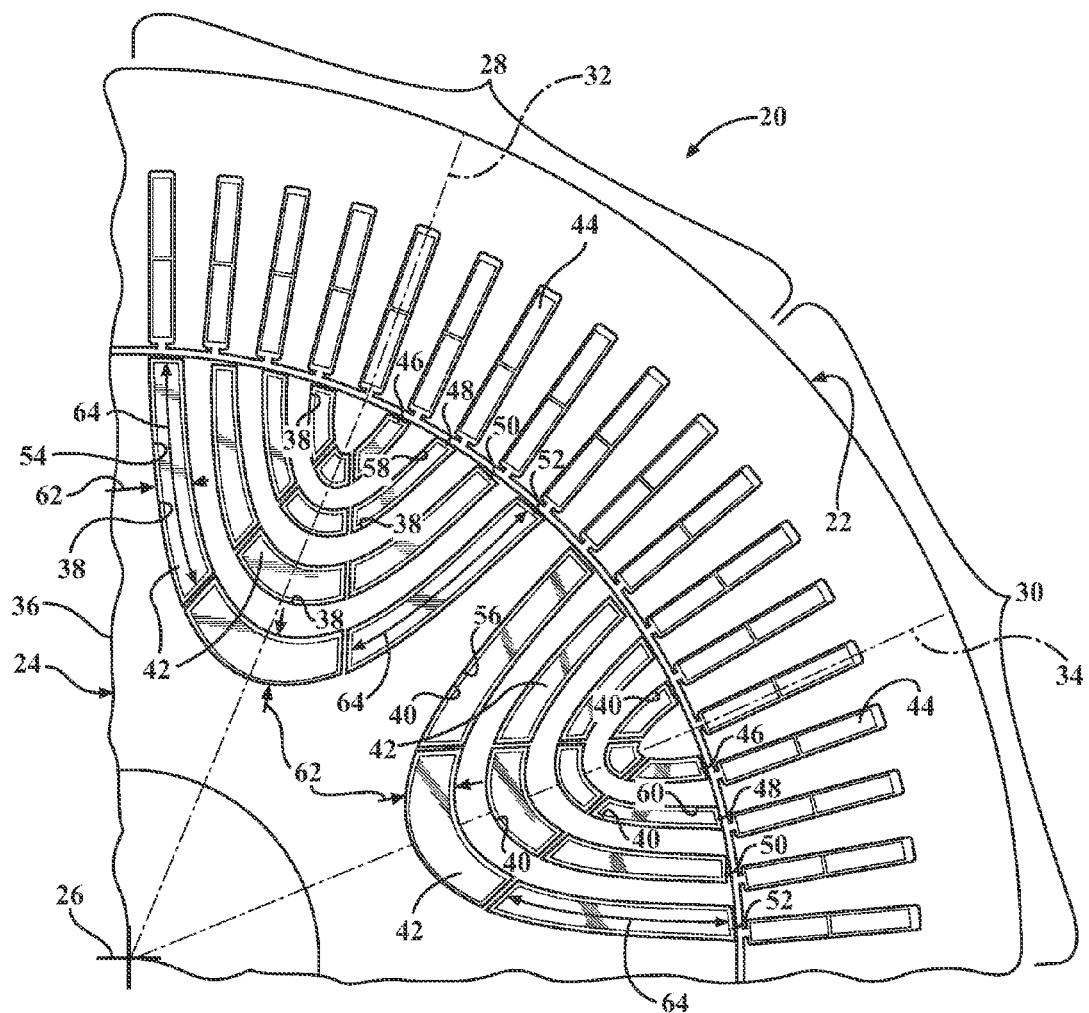
FIG. 2 is an enlarged schematic fragmentary cross sectional view of the internal permanent magnet machine.

The shape and orientation of the magnets 42 and their respective cavities is described in detail below with reference to FIG. 2. While the description provided herein is limited to the first pole 28 and the second pole 30 shown in FIG. 2, it should be appreciated that all of the first poles 28 and all of the second poles 30 of the rotor assembly 24 may be identical to the orientation described herein with reference to the first pole 28 and the second pole 30 shown in FIG. 2.

The first pole cavities 38 and the second pole cavities 40 are each arranged in a pre-defined configuration, such that each pole cavity of the first pole cavities 38 is identically positioned within the pre-defined configuration of the first pole cavities 38 with one of the pole cavities of the second pole cavities 40 within the pre-defined configuration of the second pole cavities 40, to define a corresponding pair of pole cavities. For example, referring to FIG. 2, the exemplary embodiment of the pre-defined configuration used by each of the first pole 28 and the second pole 30 includes a first row 46, a second row 48, a third row 50, and a fourth row 52 radially spaced from each other relative to the central axis of rotation 26. The first row 46 is spaced radially farther from the central axis of rotation 26 than the second row 48, the second row 48 is spaced radially farther from the central axis of rotation 26 than the third row 50, and the third row 50 is spaced radially farther from the central axis of rotation 26 than the fourth row 52. Accordingly, the fourth row 52 is the row that is radially nearest to the central axis of rotation 26, whereas the first row 46 is the row that is radially farthest from the central axis of rotation 26. Each of the first row 46, the second row 48, the third row 50, and the fourth row 52 includes three pole cavities, each containing a magnet 42.

While the exemplary embodiment of the pre-defined configuration is shown having four rows, with three cavities in each row, it should be appreciated that the pre-defined configuration may vary from the exemplary embodiment shown and described herein.

As described above, each of the first pole cavities 38 and the second pole cavities 40 are arranged in this same pre-defined configuration. As described above, the exemplary embodiment of the pre-defined configuration includes four rows, with each row having three cavities. As shown in FIG. 2, an example of a corresponding pair of cavities includes cavity 54 of the first pole 28 and cavity 56 of the second pole 30. It should be appreciated that cavity 54 of the first pole 28 and cavity 56 of the second pole 30 are corresponding cavities because each is positioned on the left side of their respective pole axis, and in the fourth row 52 of their respective pre-defined configuration. Similarly, another example of a corresponding pair of cavities includes cavity 58 of the first pole 28 and cavity 60 of the second pole 30. It should be appreciated that cavity 58 of the first pole 28 and cavity 60 of the second pole 30 are corresponding cavities because each is positioned on the right side of their respective pole axis, and in the second row 48 of their respective pre-defined configuration. It should further be appreciated that each cavity of the first pole 28 includes a corresponding cavity of the second pole 30. As such, because the exemplary embodiment of the pre-defined configuration includes twelve cavities and magnets, there are twelve corresponding pairs of cavities in the exemplary embodiment.

Figure 3:
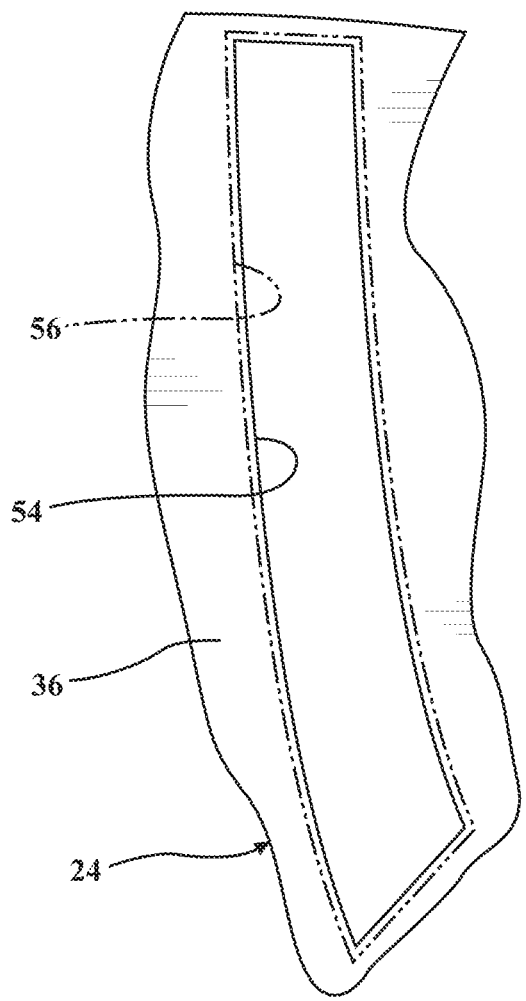
FIG. 3 is an enlarged schematic fragmentary cross sectional view of a rotor assembly of the internal permanent magnet machine.

Each corresponding pair of pole cavities of the first pole 28 and the second pole 30 include a substantially similar shape. However, the exact shape of each of the corresponding pair of pole cavities, and thereby the magnets 42 disposed therein, may differ slightly in order to reduce torque ripple in the internal permanent magnet machine 20. The exact shape and size of the cavities may be varied in order to control torque ripple of the IPM machine 20. It should be appreciated that changing the shape and size of the cavities will change the shape and size of the magnet 42 disposed therein, and thereby change the weight of the magnet 42 disposed within each respective cavity. Specifically, the pole cavity of the first pole cavities 38 and the pole cavity of the second pole cavities 40 of at least one of the corresponding pair of pole cavities, may each define a slightly different shape relative to each other, such that each magnet 42 of each corresponding pair of magnets 42 include a different shape relative to each other. For example, cavity 54 may include a slightly different shape and/or size than cavity 56. Each corresponding pair of cavities shown in FIG. 2 may appear to include the same size and shape relative to each other. However, this is only due to the scale of the drawings. The difference in the size and shape of each of the corresponding cavities, such as cavities 54, 56, is very small, and is not perceptible in FIGS. 1 and 2 at their current scale. However, referring to FIG. 3, the rotor assembly 24 is shown enlarged. The cavity 54 is shown in solid lines. The cavity 56 is shown in phantom superimposed over cavity 54 to illustrate an exemplary difference in size between the two corresponding pair of cavities 54, 56.

While only one of the corresponding pairs of cavities may include cavities of different shapes, it should be appreciated that more than one or all of the corresponding pairs of cavities may include cavities of a different shape. As such, each pole cavity of each pair of the corresponding pairs of pole cavities may include a different shape relative to the other pole cavity of each respective corresponding pair of pole cavities.

Preferably, and as shown, each pole cavity of each of the plurality of first pole cavities 38 and the plurality of second pole cavities 40 includes a cross sectional shape perpendicular to the central axis of rotation 26 that is defined by the conic section Equation 1.

$$Ax^2+Bxy+Cy^2+Dx+Ey+F=0 \qquad 1)$$

Within Equation 1, A, B, C, D, E, and F are constants; x is a value along an x-axis of a Cartesian coordinate system; and y is a value along a y-axis of a Cartesian coordinate system.

As noted above, the difference in size and shape between the cavities of the corresponding pair of cavities is very small. Each pole cavity of each corresponding pair of pole cavities may include a dimension that differs by at least 0.1 mm. The dimension may, for example, include a width 62 of the respective cavity, or a length 64 of the respective cavity. While the width 62 and the length 64 of the pole cavities is generally shown with reference to cavity 54, it should be appreciated that all of the first pole cavities 38 and the second pole cavities 40 define their own respective width 62 and length 64. The difference in shape between the cavities of the corresponding pair of cavities may by defined by one of a difference in one of the constants A, B, C, D, E, and F of the conic section Equation 1 noted above, which describes the shape of each of the respective cavities.

The rotor assembly 24 is manufactured by forming the rotor core 36 to include the first pole 28 defining the plurality of first pole cavities 38, and the second pole 30 defining the plurality of second pole cavities 40, with each of the first pole cavities 38 and the second pole cavities 40 formed in the pre-defined configuration. As described above, at least one of the corresponding pairs of cavities is formed to include cavities that include a similar yet different size and shape. Furthermore, as described above, more than one or all of the corresponding pairs of cavities may be formed to include cavities that include a similar yet different size and shape. At least one dimension of the size and shape of each corresponding pair of cavities may differ by at least 0.1 mm.

Once the rotor core 36, including the first pole cavities 38 and the second pole cavities 40 is formed, a molten magnetic material that will form the magnets 42 is introduced into each of the plurality of first pole cavities 38 and the plurality of second pole cavities 40. The magnetic material is heated to its melting point, thereby forming the molten magnetic material. The magnetic material may be heated to its melting point in any suitable manner. The molten magnetic material may completely fill, or only partially fill each respective cavity. Once the molten magnetic material is disposed within the respective cavities, the molten magnetic material is cooled within each of the first pole cavities 38 and the second pole cavities 40 of the rotor core 36 to form the plurality of magnets 42 in each pole cavity respectively.

By forming the magnets 42 in the cavities of the rotor core 36 through the injection molding process described above, the magnets 42 may be formed to include slightly different shapes as described above, without having to pre-form and manufacture each variation in size of the magnets 42, thereby simplifying the manufacturing process without increasing manufacturing costs.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An internal permanent magnet machine comprising:
   a wound stator;
   a rotor core including a first pole defining a plurality of first pole cavities, and a second pole defining a plurality of second pole cavities, wherein the rotor core magnetically interacts with the wound stator for rotation about a central axis of rotation; and
   a plurality of magnets, with a respective one of the plurality of magnets disposed within a respective one of each of the plurality of first pole cavities, and a respective one of the plurality of magnets disposed within a respective one of the plurality of second pole cavities, wherein each of the plurality of magnets is injection molded into its respective cavity, such that each of the magnets is formed by the shape of their respective cavity;
   wherein the plurality of first pole cavities and the plurality of second pole cavities are each arranged in a pre-defined configuration, such that each pole cavity of the plurality of first pole cavities is identically positioned within the pre-defined configuration of the plurality of first pole cavities with one of the pole cavities of the plurality of second pole cavities within the pre-defined configuration of the plurality of second pole cavities, to define a corresponding pair of pole cavities;
   wherein the pole cavity of the plurality of first pole cavities and the pole cavity of the plurality of second pole cavities of at least one of the corresponding pair of pole cavities define a different shape relative to each other, such that each magnet of each corresponding pair of magnets has a different shape relative to each other; and
   wherein each pole cavity of each of the plurality of first pole cavities and the plurality of second pole cavities includes a cross sectional shape perpendicular to the central axis of rotation that is defined by a generalized conic section equation:

$$Ax^2+Bxy+Cy^2+Dx+Ey+F=0$$

wherein A, B, C, D, E, and F are constants, x is a value along an x-axis of a Cartesian coordinate system, and y is a value along a y-axis of a Cartesian coordinate system.

2. The internal permanent magnet machine set forth in claim 1 wherein each pole cavity of each pair of the corresponding pairs of pole cavities includes a different shape relative to each other.

3. The internal permanent magnet machine set forth in claim 2 wherein each pole cavity of each corresponding pair of pole cavities includes a dimension that differs by at least 0.1 mm.

4. The internal permanent magnet machine set forth in claim 1 wherein the pre-defined configuration includes a first row, a second row, a third row, and a fourth row radially spaced from each other relative to the central axis of rotation, wherein first row is spaced radially farther from the central axis of rotation than the second row, the second row is spaced radially farther from the central axis of rotation than the third row, and the third row is spaced radially farther from the central axis of rotation than the fourth row.

5. The internal permanent magnet machine set forth in claim 4 wherein each of the first row, the second row, the third row, and the fourth row includes three pole cavities.

6. The internal permanent magnet machine set forth in claim 1 wherein the magnets disposed in the plurality of first pole cavities are formed from a first material, and the magnets disposed in the plurality of second pole cavities are formed from a second material that is different than the first material.

7. The internal permanent magnet machine set forth in claim 1 further comprising a plurality of first poles and a plurality of second poles arranged in alternating relationship with each other angularly about the central axis of rotation.

8. An internal permanent magnet machine comprising:
   a wound stator;
   a rotor core including a first pole defining a plurality of first pole cavities, and a second pole defining a plurality of second pole cavities, wherein the rotor core magnetically interacts with the wound stator for rotation about a central axis of rotation; and
   a plurality of magnets, with a respective one of the plurality of magnets disposed within a respective one of each of the plurality of first pole cavities, and a respective one of the plurality of magnets disposed within a respective one of the plurality of second pole cavities, wherein each of the plurality of magnets is injection molded into its respective cavity, such that each of the magnet is formed by the shape of their respective cavity;
   wherein the plurality of first pole cavities and the plurality of second pole cavities are each arranged in a pre-defined configuration, such that each pole cavity of the plurality of first pole cavities is identically positioned within the pre-defined configuration of the plurality of first pole cavities with one of the pole cavities of the plurality of second pole cavities within the pre-defined configuration of the plurality of second pole cavities, to define a corresponding pair of pole cavities;
   wherein the pole cavity of the plurality of first pole cavities and the pole cavity of the plurality of second pole cavities of at least one of the corresponding pair of pole cavities define a different shape relative to each other, such that each magnet of each corresponding pair of magnets has a different shape relative to each other;
   wherein each pole cavity of each of the plurality of first pole cavities and the plurality of second pole cavities has a cross sectional shape perpendicular to the central axis of rotation that is defined by a generalized conic section equation:

$$Ax^2+Bxy+Cy^2+Dx+Ey+F=0; \text{ and}$$

wherein A, B, C, D, E, and F are constants, x is a value along an x-axis of a Cartesian coordinate system, and y is a value along a y-axis of a Cartesian coordinate system.

9. The internal permanent magnet machine set forth in claim 8 wherein each pole cavity of each corresponding pair of pole cavities includes a dimension that differs by at least 0.1 mm.

10. The internal permanent magnet machine set forth in claim 8 wherein the pre-defined configuration includes a plurality of rows radially spaced from each other relative to the central axis of rotation.

11. The internal permanent magnet machine set forth in claim 10 wherein each of the plurality of rows of the pre-defined configuration includes a plurality of pole cavities.

* * * * *